United States Patent [19]
Alford

[11] 3,994,829
[45] Nov. 30, 1976

[54] PROCESS FOR PRODUCTION OF ACTIVATED CARBON

[75] Inventor: Harvey E. Alford, Amherst, Ohio

[73] Assignee: Standard Oil Company, Cleveland, Ohio

[22] Filed: June 17, 1974

[21] Appl. No.: 480,434

Related U.S. Application Data

[63] Continuation-in-part of Ser. No. 91,933, Nov. 23, 1970, abandoned.

[52] U.S. Cl. .............................. 252/421; 201/33; 202/100; 202/117; 423/151
[51] Int. Cl.² .......................................... B01J 21/18
[58] Field of Search ............. 252/421, 445; 201/23, 201/33, 34; 423/449, 445; 202/100, 117, 216

[56] References Cited
UNITED STATES PATENTS

| | | | |
|---|---|---|---|
| 1,565,129 | 12/1925 | Wallace | 252/421 |
| 1,806,020 | 5/1931 | Parker et al. | 252/411 R |
| 2,393,214 | 1/1946 | Andrews | 252/421 |
| 3,153,633 | 10/1964 | Dreusche, Jr. | 252/421 |
| 3,592,779 | 7/1971 | Kiikka | 252/421 |

Primary Examiner—Patrick P. Garvin
Assistant Examiner—P. E. Konopka
Attorney, Agent, or Firm—Herbert D. Knudsen; Larry W. Evans

[57] ABSTRACT

An improved process for the production in high yield of activated carbon particles of high activity comprises rapid removal of volatile material from the area of carbonaceous particles during the carbonization step by individually venting each hearth of a multiple hearth furnace. The carbonaceous particles which are subjected to the carbonization step are prepared from mixtures of carbonaceous material and petroleum acid sludge.

4 Claims, 1 Drawing Figure

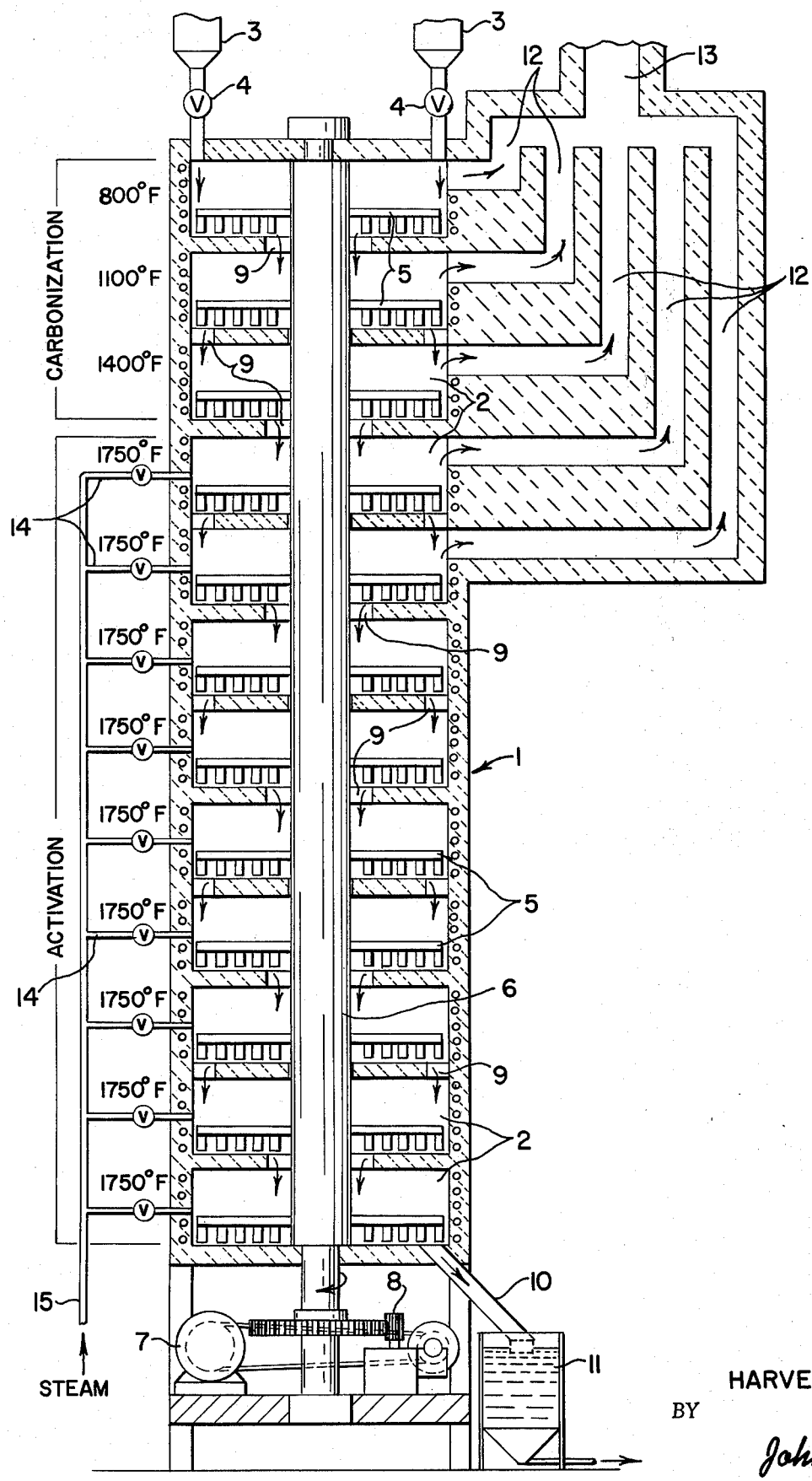

PROCESS FOR PRODUCTION OF ACTIVATED CARBON

CROSS-REFERENCE TO RELATED APPLICATION

This is a continuation-in-part of my prior application Ser. No. 91,933 filed Nov. 23, 1970, now abandoned.

BACKGROUND OF THE INVENTION

U.S. Pat. No. 3,592,779 described a very desirable process for making active carbon. When this process was attempted on a commercial scale, the time required to activate the carbon material was surprisingly long when one vent was used during carbonization in a multiple hearth furnace. The present invention was made during the search to discover the problem that created this unduly long activation time and the search for a solution to the problem found.

SUMMARY OF THE INVENTION

It has been discovered in the process for preparing active carbon particles comprising a. mixing and shaping a particulate carbon material with petroleum acid sludge to form shaped articles therefrom;

b. hardening the shaped articles from (a) by a heat treatment;

c. deacidification of the material from (b) by further heat treatment;

d. carbonization of the material from (c) with further heat treatment and removal of substantially all the volatile matter from these materials; and e. activation of the shaped articles from (d), the improvement comprising carrying out step (d) in a multiple hearth furnace where each hearth is individually vented in such a manner that the volatile matter is removed from the vicinity of all of the material being carbonized substantially as rapidly as it is formed.

In the practice of the invention, the beads to be carbonized are heated in a multiple hearth furnace, such as that described in U.S. Pat. No. 3,153,633, which is equipped with an exhaust port in each hearth so that substantially all volatile matter formed in each hearth area is rapidly exhausted from the furnace and is allowed only a minimum contact with the beads. A representative multiple hearth furnace useful for conducting steps (d) and (e) of the present invention is shown in the accompanying drawing.

In the process more completely described in U.S. Pat. No. 3,592,779, a particulate carbon material selected from the group consisting of petroleum coke, acid coke, wood charcoal, bituminous coal, lignite, carbon black and charred vegetable materials having particles smaller than 42 Tyler mesh are mixed with a mineral acid sludge comprising at least 5 percent by weight of hydrocarbons is (1) mixed in the ratios of from 5:1 to 1:5 parts by weight of carbon material to acid sludge and shaped into beads by a folding or tumbling mixing action at a temperature between 0° F. and 300° F., (2) dried and hardened at a temperature in the range of from 180° F. to 300° F., (3) deacidified at a temperature in the range of from 300° F. to 700° F., (4) carbonized at a temperature in the range of from about 700° F. to 1500° F. to form a sintered article, and finally (5) activated by contacting the sintered article with a mildly oxidizing gas such as steam or $CO_2$ at a temperature in excess of 1500° F.

DESCRIPTION OF THE DRAWING

A typical modified multiple hearth furnace which is particularly useful for the carbonization and activation steps (steps d and e) of this invention is shown in the accompanying drawing wherein the multiple hearth furnace 1 contains several hearth areas as at 2. The material to be carbonized which is usually in the form of small beads to be activated is fed to the furnace 1 from a hopper 3 through a valve 4. The individual hearth areas 2 are each heated with a separate heating means not shown so that the temperature within each hearth area can be maintained at any desired temperature independent of all others. In each hearth area there is a rotatable rabble arm 5 which is like a rake connected to a drive shaft 6 which is rotated by a driver 7 and gear means 8. As the drive shaft 6 is rotated the rabble arms sweep the beads through openings 9 in each hearth area 2 so that when the furnace is in proper operation the carbon material flows progressively downwardly from the hopper 3 through the hearth areas 2 of the furnace 1 and finally out of the bottom of the furnace at 10 into a hopper 11 and on to a storage or packaging area. In the upper area of the furnace 1 there is provided a series of vents 12 from each of the upper hearth areas 2 for the independent removal of the gases and volatile material from each of the upper hearth areas 2. These vents 12, each of which may be equipped with damper controls for preventing backdraft, lead into a common stack 13 through which the volatiles and gases are vented or carried to a recovery area not shown. In each of the hearth areas 2 below those used for the carbonization there is provided a vapor line 14 for the introduction of activation gases and vapors into each hearth area 2 which activation gases may be supplied from a single source 15 near the bottom of the furnace 1.

The process of this invention is best illustrated in the following examples wherein the amounts of the various materials mentioned are expressed as parts by weight unless otherwise indicated.

Comparative Example A and Example 1 -

Comparison of individual vents to one common vent

A carbon material for carbonization and activation was prepared as follows:

A. An acid sludge was prepared from cat light gas oil and sulfuric acid at 180° F. with a contact time of 30 minutes and with mechanical stirring at 1550 R.P.M. The cat light gas oil was added to the reactor at a rate of 1.10 pounds per minute and the sulfuric acid was added at the rate of 0.77 pounds per minute. A total of 58.9 weight percent of cat light gas oil and 41.10 percent sulfuric acid was used. The product was composed of 61.68 percent by weight of acid sludge, 36.76 percent by weight of raffinate and 1.56 percent by weight of $SO_2$ was volatized during the reaction and work up. The acid sludge prepared in this manner was found to have a density of 1.4 grams/cc. and a viscosity of 10,000 CPS at 75° F.

The acid sludge and a high volatiles Class A bituminous coking coal powder were mixed to form small aggregates of approximately spherical shape by the following procedure. A total of 67 percent by weight of coal having 98%–100 mesh size (Tyler mesh) and 33 weight percent of acid sludge were mixed in an end discharge ribbon mixer at room temperature with a total mixing time of about 15 minutes. The particulate product in the 4–18 mesh range was removed at the discharge end and particles greater than 4 and less than 18 mesh were recycled. The product had a bulk density of 0.741 g/cc.

B. Material from A was dried in a rotary drier which was rotated at 4.5 R.P.M., a temperature of 250° F. was employed, a retention time of 15 minutes was used and air was passed through the drier at the rate of 640 cubic feet per hour. The air flow was such that volatile material from the carbonaceous material being dried was removed from the drying chamber and air was allowed to pass through the drier in the same direction as the solid. The feed rate to the drier was 48.25 pounds of material per hour and the product was removed at the rate of 45.74 pounds per hour with a weight yield of 94.82 percent based on the weight of the material fed.

C. The dried product described in B was deacidified by passing it through the same apparatus described in B above using a shaft speed of 4.5 R.P.M., a temperature of 650° F., a retention time of 15 minutes, a feed rate of 54.74 pounds per hour and parallel gas flow as described in A above. The deacidified product was obtained at the rate of 41.49 pounds per hour in 75.79 percent by weight yield. The product had a particle size in the 4–18 mesh range and a bulk density of 0.655 g/cc.

Example 1

D. The material described in C was carbonized in a multiple hearth furnace having six hearths each 30 inches in diameter. The feed rate was 75 pounds per hour and the retention time was one hour. The approximate temperatures of each of the hearths (gas phase) starting with the top hearth were as follows:

| Hearth | Temp., ° F. |
|--------|-------------|
| 1 | 340 |
| 2 | 890 |
| 3 | 1040 |
| 4 | 1315 |
| 5 | 1535 |
| 6 | 1540 |

The gases from each of the hearths Nos. 2, 3, 4, 5 and 6 were exhausted separately during the carbonization so that there was no upward movement of volatile material removed from the carbonaceous material as it passed downwardly through the furnace. A weight yield of 76.4 percent was obtained and the product was found to have a bulk density of 0.755 g/cc.

E. The carbonized product from D was activated in the activation step using the multiple hearth furnace described in D of this example at a temperature (gas phase) of 1750° F. Steam was introduced into hearths Nos. 2, 3, 4 and 5 at a total steam rate of 120 pounds per hour. The feed rate of carbonized material was 20 pounds per hour and the retention time was 3 hours. The furnace gases were exhausted only from hearth No. 1. The weight yield of activated carbon was 59.4 percent. The product has a bulk density of 0.548 g/cc. and a weight percent $CCl_4$ adsorption of 59.5.

Comparative Example A

D. The procedure of Example 1D was repeated except that the multiple hearth furnace was exhausted only from hearth No. 1. A weight yield of 61.9 percent was obtained and the carbonized product had a bulk density of 0.722 g/cc.

E. The activation procedure of Example 1E was repeated using the material from above as feed. A weight yield of 79.6 percent was obtained and the activated product had a bulk density of 0.625 g/cc. and a $CCl_4$ adsorption of 25.0 percent by weight.

The results of these experiments are summarized in the following Table.

Table

Effect of Venting Each Hearth of a Multiple Hearth Furnace Individually as Compared to Using Single Vent

| Example | Venting | Results | |
|---------|---------|---------|---|
| | | $CCl_4$ Adsorption | Yield in Carbonization and Activation Steps, Wt. % |
| 1 | Each hearth vented | 59.5 | 45.4 |
| Comp. A | Only one hearth vented | 25.0 | 49.2 |

Thus, it is seen at approximately the same weight percent yield the use of the present invention gives over twice as much $CCl_4$ adsorption. This higher $CCl_4$ adsorption makes the invention substantially superior to the art.

I claim:
1. In the process for preparing active carbon particles comprising
   a. mixing and shaping a particulate carbon material selected from the group consisting of petroleum coke, acid coke, wood charcoal, bituminous coal, lignite, carbon black and charred vegetable materials with petroleum acid sludge to form shaped articles therefrom;
   b. hardening the shaped articles from (a) by a heat treatment;
   c. deacidification of the material from (b) by further heat treatment;
   d. carbonization of the material from (c) with further heat treatment in the temperature range of from about 700° F to 1500° F and removal of substantially all of the volatile matter from these materials; and
   e. activation of the shaped articles from (d) with a gas comprising steam carried out at a temperature greater than 1500° F, the improvement comprising carrying out step (d) in a multiple hearth furnace where each hearth is individually vented in such a manner that the volatile matter is removed from the vicinity of all of the material being carbonized substantially as rapidly as it is formed.

2. The process of claim 1 wherein step (a) is carried out at a temperature in the range of from about 0° F. to 300° F.

3. The process of claim 2 wherein step (b) is carried out in the temperature range of from about 180° F. to 300° F.

4. The process of claim 3 wherein step (c) is carried out in the temperature range of from about 300° F. to 700° F.

* * * * *